United States Patent [19]
Yannoni

[11] 4,199,223
[45] Apr. 22, 1980

[54] PORTABLE OPTICAL FIBER COUPLING DEVICE

[75] Inventor: Nicholas F. Yannoni, Newton, Mass.

[73] Assignee: The United States of America as represented by the Secretary of the Air Force, Washington, D.C.

[21] Appl. No.: 891,876

[22] Filed: Mar. 30, 1978

[51] Int. Cl.² ............................................... G02B 2/14
[52] U.S. Cl. ................................. 350/96.21; 219/123
[58] Field of Search ..................... 350/96.20, 96.21; 65/4 A, 4 B, 152; 219/121 R, 123

[56] References Cited
U.S. PATENT DOCUMENTS

| 3,634,649 | 1/1972 | Rager | 219/137 R |
| 3,960,531 | 6/1976 | Kohanzadeh | 350/96.21 |

OTHER PUBLICATIONS

T. Kohanzadeh "Hot Splices of Optical Waveguide Fibers" Applied Optics, vol. 15, No. 3, Mar. 1976, pp. 793–795.

*Primary Examiner*—Rolf G. Hille
*Attorney, Agent, or Firm*—Joseph E. Rusz; Henry S. Miller

[57] ABSTRACT

A portable device for coupling optical fibers consisting of an insulative block so designed as to allow a number of optical fibers to come together, a piezoelectric generating means secured to the block and connected to the piezoelectric generator so that optical fibers will be brought together at a point between the electrodes. Electricity generated causes an arc across the electrodes which generates sufficient heat to join the optical fibers.

5 Claims, 2 Drawing Figures

PORTABLE OPTICAL FIBER COUPLING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of optical fibers and more specifically to a means for joining optical fibers. There has been very recently a great deal of interest shown in the field of fiber optics. With the constant desire to reduce size and weight while increasing capacities, the optical fiber appears to be the solution in a great many instances. In the field of communications and data processing, the optical fiber has the added advantages of conserving raw materials of copper and aluminum as well as eliminating such undesirable features of bundled wires, such as "cross talk".

Fiber optics however cannot be handled in a conventional manner as one would electrical wiring. The use of conventional connectors, mounting blocks and splicing devices do not apply in this art. Optical fibers carry light at a high modulated frequency within the fiber and as a result, the fibers must be connected end-to-end. This allows the light to travel on a continuous path without interruption from source to use.

Difficulty has arisen where these fibers, approximately 0.01 mm in diameter or 1/10th the diameter of a human hair must be coupled. In the setting of a manufacturing installation, the difficulties can be resolved and the processes continued. However, where optical fibers are required to be coupled in the field, the process can be difficult and nearly impossible in some situations. For example, many cities are beginning to install fiber optical telephone systems. These systems still require telephone installers and repairmen to couple (splice) defective or broken cables. This will continue to take place in manholes beneath the city streets or on the top of telephone poles at night during raging snow and rain storms.

Therefore, the processes and equipment utilized to connect fibers during the manufacturing process would not apply to field operations, particularly those taking place under adverse conditions.

The instant invention provides a simple low cost means for coupling optical fibers in a highly efficient manner, solving the problems of currently existing devices.

SUMMARY OF THE INVENTION

The invention relates to a new and novel means for coupling optical fibers. The invention is completely portable, light weight and compact, ideally suited for field work.

In one embodiment, the coupling device consists of a block of highly insulative material such as bakelite, along one central axis of the block is a passage which is enlarged at each end to form the general shape of a cone. The apex of each cone faces inwardly toward the center of the block and are separated by a few millimeters of narrow passage.

At the point of narrow passage are located two electrodes which are connected to a piezoelectrical discharge device mounted outside of and attached to the block. A slot is formed in the side of the block and parallel to the passage and connecting the passage to the outside of the block.

In operation the fine optical fibers are placed into each end of the block via the conical shaped passages. The fibers are butted against each other at the narrow passage with an electrode above and below. The piezoelectric generator is activated and an electric arc will jump the gap thereby creating sufficient heat to join the fibers. Once the fibers are joined they are removed via the elongated slot in the side of block.

An alternative embodiment of the invention consists of a block of insulative material having a hinge along one side preferably along the side containing the piezoelectric generator. The block is divided approximately in half and secured by the hinge on one side and a locking clamp on the other. The block contains a plurality of openings on each end and along the side if desired. These openings are formed by channels constructed in the two pieces of block and may form any shape desired. However, all channels pass through one point between the electrodes.

In operation, the block is open, each piece containing one electrode, the optical fibers are placed in the selected channels with their ends all resting between the upper and lower electrodes. One or more fibers must be butted against other fibers in order for the optical conductor to function. The top block is closed on the bottom block channels mating in the process securing the fibers in place. An arc is generated by the piezoelectric generator and the fibers joined subsequently, the block is opened and the fibers removed.

It is therefore an object of the invention to provide a new and improved coupling device for optical fibers.

It is another object of the invention to provide a new and improved optical fiber coupling device that is portable and can be conviently carried from place to place.

It is a further object of the invention to provide a new and improved optical fiber coupling device that is compact, light weight and easily carried.

It is still another object of the invention to provide a new and improved fiber coupling device that requires no external source of electrical energy with which to operate.

It is still a further object of the invention to provide a new and improved fiber coupling device that will allow a plurality of fibers to be coupled simultaneously.

It is another object of the invention to provide an optical fiber coupling device that easily maintained, low in cost and highly reliable.

These and other advantages, features and objects of the invention will become more apparent from the following description taken in connection with the illustrative embodiments in the accompanying drawings:

DESCRIPTION OF THE PREFERRED EMBODIMENTS

Figure 1:
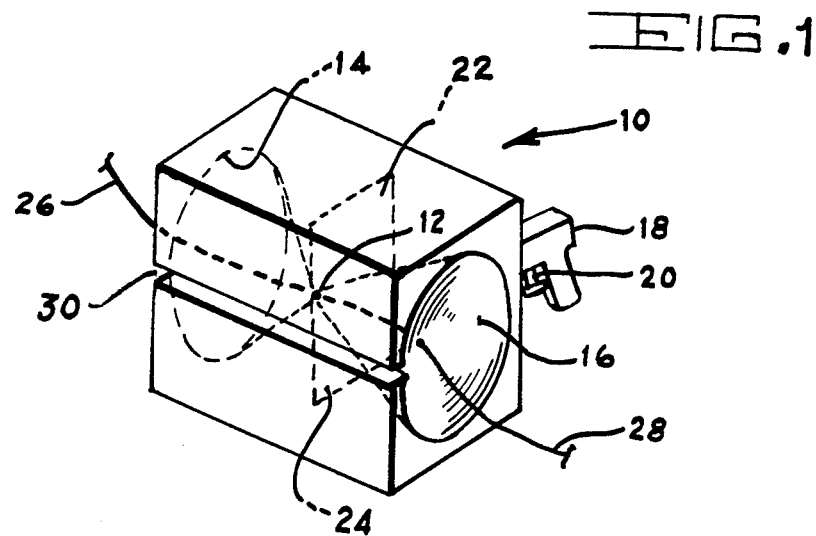
FIG. 1 is a schematic representation of a preferred embodiment.

Referring now to FIG. 1, a highly insulative block is shown generally at 10. A passage 12 passes along the central longitudinal axis of the block, having conically shaped ends 14, 16 and meeting passage 12 at their apex. A griplike device 18 is secured to the side of the block by any conventional means. The griplike device contains a piezoelectric element which is placed under pressure by grip trigger 20. The pressure causes an electrical potential difference to occur between electrodes 22, 24. The electrodes are spaced such that an electric arc will jump a gap created by passage 12, when sufficient pressure is exerted on the piezoelectric material by the trigger 20.

Fibers 26, 28 are fed into conical guides 14, 16 to a center point in passage 12 where they are in abutted position and exposed to the electric arc generated between the electrodes. Heat from the arc joins the fibers which are then withdrawn through slot 30 which connects the passage to the outside of the block. This embodiment allows two fibers to be butt joined as rapidly as they are able to be fed into the block and the trigger squeezed.

Figure 2:
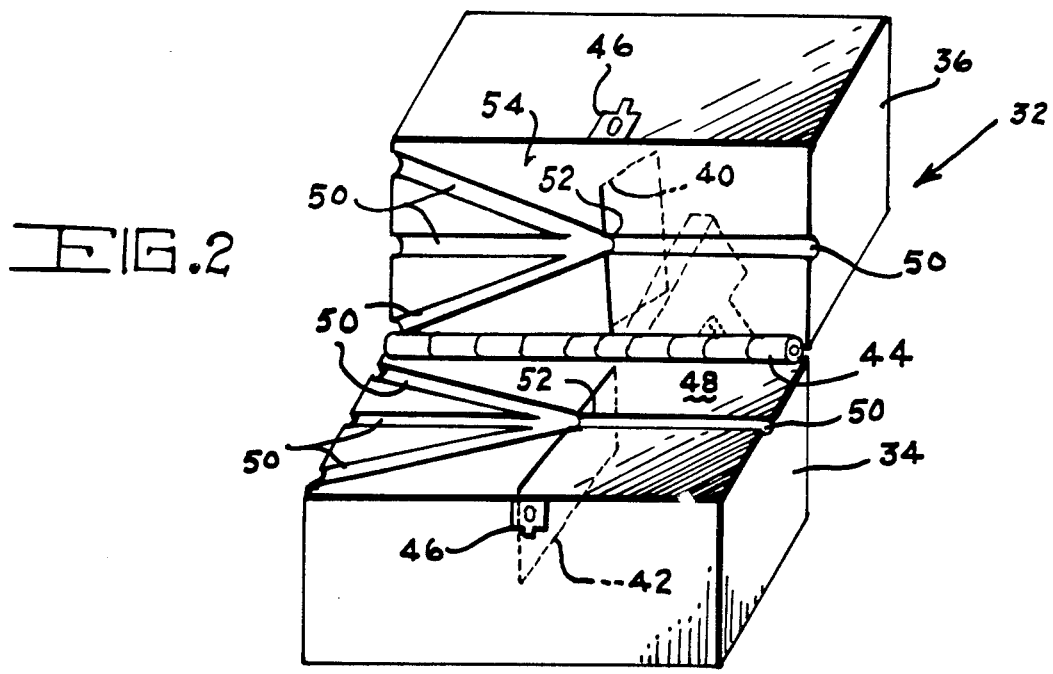
FIG. 2 is a schematic representation of an alternative embodiment.

FIG. 2 shows a block which will accommodate T-splices or tangent fan-out splices as well as the single splice as described with regard to FIG. 1. The insulated block is shown generally at 32 and is divided into two parts 34, 36. Piezoelectric generator 38 is affixed to part 34 and electrically connected to electrodes 40, 42. Parts 34, 36 are held in a movable relationship by hinge 44 and secured by latch 46. Located in the surface 48 are grooves 50 which are designed to provide a tangent fanout splice, the coupling point being at point 52 where the fibers join between electrodes 40, 42. Surface 54 has grooves 50 identical to those in surface 48 thereby forming circular passages, the diameter of the fibers when parts 34 and 36 are secured in a closed mating relationship.

In operation, the fibers to coupled are placed in the appropriate grooves with part 36 separated from 34. Once the fibers are in place, part 36 is closed and latched, and an arc created between the electrodes. Immediately the block is separated, the joined fibers removed, and the device is ready to be reused. The design and configuration of the grooves 50 may be changed as required for any specific task.

Although the invention has been described with reference to particular embodiments, it will be understood to those skilled in the art that the invention is capable of a variety of alternative embodiments within the spirit and scope of the appended claims.

What is claimed is:

1. A portable optical fiber coupling device comprising: a block of solid insulative material; a passage for optical fiber located along the central axis of said block; piezoelectric means for generating an electrical potential difference fixed to said block; a pair of electrodes positioned in the block adjacent said passage and connected to said means for generating whereby a potential created by the generating means will cause an arc between said electrodes thereby coupling fibers positioned therebetween.

2. A portable optical fiber coupling device according to claim 1 including a slot in said block extending to the passage for removing coupled fibers.

3. A portable optical fiber coupling device according to claim 1 wherein each end of said passage is conically shaped having its apex connected to the passage at the said electrodes.

4. A portable optical fiber coupling device according to claim 1 wherein said block is in two parts mounted in a hinged relationship.

5. A portable optical fiber coupling device according to claim 4 including a plurality of matched grooves in the abutting faces of each of said parts.

* * * * *